US006210777B1

(12) United States Patent

Vermeulen et al.

(10) Patent No.: US 6,210,777 B1
(45) Date of Patent: *Apr. 3, 2001

(54) SECURITY DOCUMENT HAVING A TRANSPARENT OR TRANSLUCENT SUPPORT AND CONTAINING INTERFERENCE PIGMENTS

(75) Inventors: Leo Vermeulen, Herenthout; Daniel De Baets, Mariakerke, both of (BE)

(73) Assignee: Agfa-Gevaert, Mortsel (BE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/656,308

(22) PCT Filed: Nov. 28, 1994

(86) PCT No.: PCT/EP94/03946

§ 371 Date: Jun. 10, 1996

§ 102(e) Date: Jun. 10, 1996

(87) PCT Pub. No.: WO95/15856

PCT Pub. Date: Jun. 15, 1995

(30) Foreign Application Priority Data

Dec. 10, 1993 (EP) ........ 93203473

(51) Int. Cl.[7] ........ B32B 5/16; B42D 15/10; B44F 1/08

(52) U.S. Cl. ........ 428/195; 428/204; 428/207; 428/323; 428/324; 428/913; 283/72; 283/902

(58) Field of Search ........ 428/195, 411.1, 428/913, 914, 323, 324, 403, 204, 207; 250/365; 283/85, 902, 72

(56) References Cited

U.S. PATENT DOCUMENTS

| | | | | |
|---|---|---|---|---|
| 4,186,020 | * | 1/1980 | Wachtel | 106/22 |
| 4,451,530 | * | 5/1984 | Kaule et al. | 428/323 |
| 5,087,507 | | 2/1992 | Heinzer | 428/195 |
| 5,254,390 | * | 10/1993 | Lu | 428/156 |
| 5,468,540 | * | 11/1995 | Lu | 428/156 |
| 5,573,584 | * | 11/1996 | Ostertag et al. | 106/417 |
| 5,693,135 | * | 12/1997 | Schmid et al. | 106/417 |

FOREIGN PATENT DOCUMENTS

| | | | | |
|---|---|---|---|---|
| 62 053 | | 4/1892 | (DE) . | |
| 3810015 | * | 10/1989 | (DE) | B44F/1/12 |
| 0 317 514 | | 5/1989 | (EP) . | |
| 2429292 | * | 1/1980 | (FR) . | |
| 202702 | | 8/1923 | (GB) . | |
| 2035587 | * | 6/1980 | (GB) | G03C/5/54 |
| 59-098891 | * | 6/1984 | (JP) | B41M/5/10 |
| 60-244588 | * | 12/1985 | (JP) | B41M/3/14 |
| 61-035985 | * | 2/1986 | (JP) | B41M/3/14 |
| WO 94/13489 | * | 6/1994 | (WO) . | |

OTHER PUBLICATIONS

Temple C. Patton, *Pigment Handbook*, vol. III, Characterization and Physical Relationships, John Wiley & Sons, Inc., p. 379. (no month), 1973.*

* cited by examiner

*Primary Examiner*—Marie Yamnitzky
(74) *Attorney, Agent, or Firm*—Breiner & Breiner

(57) ABSTRACT

A security document which contains at least one layer and a transparent or translucent support and at least one image or pattern serving for identification purposes, characterized in that the document contains at least one light interference pigment distributed uniformly or patternwise in or on at least one layer of the document and/or contains the pigment in the support.

30 Claims, 1 Drawing Sheet

Figure 1:
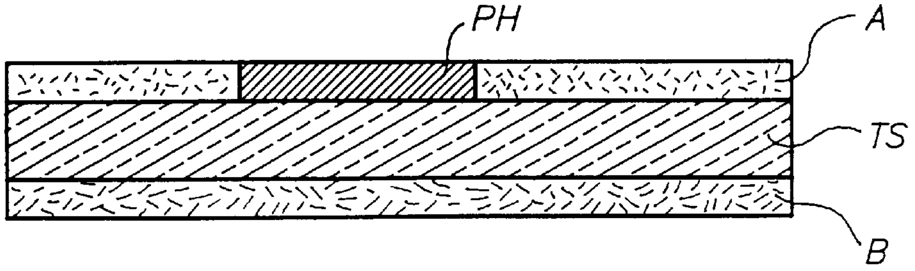

SECURITY DOCUMENT HAVING A TRANSPARENT OR TRANSLUCENT SUPPORT AND CONTAINING INTERFERENCE PIGMENTS

1. FIELD OF THE INVENTION

The present invention relates to transparent or translucent security documents that can be verified on their authenticity and are protected against counterfeiting by photo-copying.

2. BACKGROUND OF THE INVENTION

Security documents that must be verifiable on their authenticity are e.g. all kinds of identification documents such as passports, visas, identity cards, driver licenses, bank cards, credit cards, security entrance cards, and further value-documents such as banknotes, shares, bonds, certificates, cheques, lottery tickets and all kinds of entrance tickets such as airplane tickets and railroad season-tickets.

Nowadays, by the availability of markedly improved black-and-white and color copiers it becomes more and more easy to copy documents at high quality hardly to distinguish from the originals.

To protect the above mentioned documents against fraudulent alterations and reproduction by photo-copying different techniques are used such as the melt-laminating or glueing thereto of preprinted plastic overlayers; the printing with special inks; the application of coatings or layers for example loaded with magnetic or fluorescent pigments; coloring or metallizing the substrate of the documents: incorporating holograms; applying fine line printing, watermarks, fibers, security threads, light diffraction marks, liquid crystal marks and/or substances called nacreous, iridiscent or interference pigments.

In a particular case disclosed in U.S. Pat. No. 4,151,666 light-transmissive pigments serving as diffuse reflectors are applied by printing to form a verification pattern in a laminated identification card (I.D. card). In the specification of the same US-P the use of nacreous pigments in verification patterns has been described. Nacreous pigments, also called pearlescent pigments have light-reflection characteristics that change as a function of the viewing or copying angle. The effect of changing color with viewing angle makes that nacreous pigments represent a simple and convenient matter to built in a verification feature associated with a non-copyable optical property.

Interference pigments are in the form of light-reflecting crystal platelets of appropriate thickness to produce color by interference. These pigments exhibit a color play that verges on iridiscence and under a given angle of reflection will allow only the copying of a single color. Whereas other colors appear under different angles of reflection, in other words these pigments show another color to the human eye depending on the observation angle. High nacreous luster is accompanied by high specular reflectance. In most light interference pigments the transmission color is generally the complement of the reflection color.

Observed in transmission, some particular light interference pigments having more pronounced covering aspect show a particular greyish color while observed in reflection mode they have a more pronounced color-shift effect due to their specific built up and composition.

Transmission color of light interference pigments is much weaker than reflection color, which color seen in the reflection mode is called hereinafter "normal" color. [ref. Number 2 in a series of Mearl Technical Bulletins "Nacreous (Pearlescent) Pigments and Interference Pigments by L.M. Greenstein Henry L. Mattin Laboratories Reprinted from Pigment Handbook, Vol. I, Properties and Economics, 2nd Edition, Edited by Peter A. Lewis, (1988) by permission of John Wiley & Sons, Inc. The Mearl Corporation, 41 East 42nd Street. New York, N.Y. 100017, p. 5 and 6].

In interference, the reflection and transmission colors vary with angle of incidence. The reflection maximum and minimum shift to lower wavelengths as the angle of incidence increases (ref. the above mentioned Mearl Technical Bulletin, p. 8. Variation in color with angle of incidence and observation is referred to as geometric metamerism or goniochromatism [ref. Johnston, R. M. Color Eng., 5(3), 42–47, 54 (1967) and Hemmendinger, H. and Johnston R. M. "A Goniospectrophotometer for Color Measurements" in Color 69 (M. Richter. ed). Musterschmidt, Göttingen, Germany (1970)].

3. OBJECTS AND SUMMARY OF THE INVENTION

It is an object of the present invention to provide a security document having a transparent or translucent support and containing through the presence of light interference pigments a verification feature that can not be copied by photographic techniques and wherein there is no need for specialized devices or conditions to verify the document on its authenticity.

It is a particular object of the present invention to provide a security document having a transparent or translucent support and containing at least one image or pattern in conjunction with interference pigments providing special effects that can not be copied photographically.

It is a special object of the present invention to provide a security document having a transparent or translucent support and comprising a layer including a photographically obtained portrait in conjunction with different light interference pigments that allow easy verification by the naked eye of the security document involved.

Other objects and advantages of the present invention will become clear from the further description, drawings and examples.

In accordance with the present invention there is provided a security document which contains at least one layer and a transparent or translucent support and at least one image or pattern serving for identification purposes, characterized in that said document contains at least one light interference pigment distributed uniformly or patternwise in or on at least one layer of said document and/or contains said pigment in said support.

By "transparent or translucent support" in the document according to the present invention has to be understood a support having a visible light-blocking capacity less than 80%, preferably less than 50%, not being excluded supports that are inherently colored or have obtained a color by incorporation of colorants.

4. DESCRIPTION OF THE DRAWINGS

FIG. 1 represents a schematic sectional drawing in a security document according to the present invention wherein light interference pigments A are present uniformly in a layer on one side of a transparent support TS and light interference pigments B different in color with respect to pigments A are present uniformly in a layer on the other side of said support and said document contains a photographically obtained image PH in the layer containing said pigments A.

Figure 2:
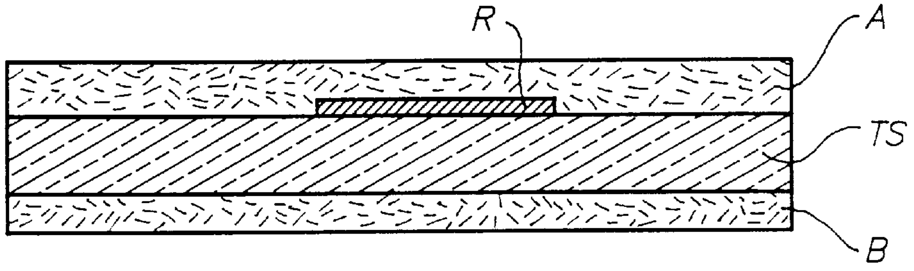

FIG. 2 represents a schematic sectional drawing of a security document according to the present invention wherein light interference pigments A are present uniformly on one side of a transparent support TS and light interference pigments B different in color with respect to pigments A are present uniformly on the other side of said support, wherein the pigments A have underneath a pattern printed with "common" light reflecting pigments R having no light interference properties.

Figure 3:
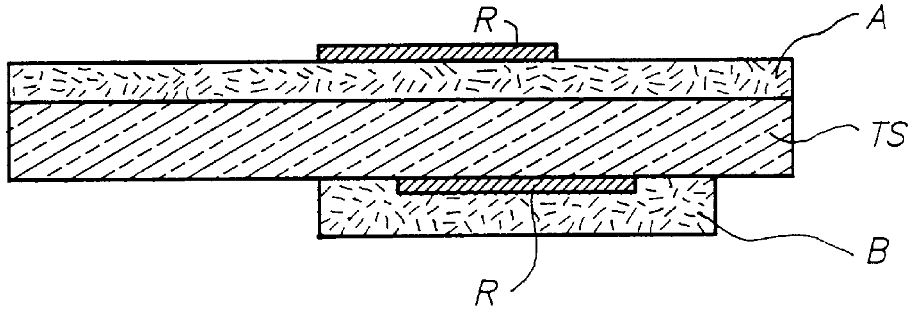

FIG. 3 represents a schematic sectional drawing of a security document according to the present invention wherein at one side of a transparent support TS a layer containing light interference pigments A has on top a printed pattern containing common light-reflecting pigments R. At the other side of said support a printed pattern containing said normal pigments R is overprinted with a pattern containing light interference pigments B.

Figure 4:
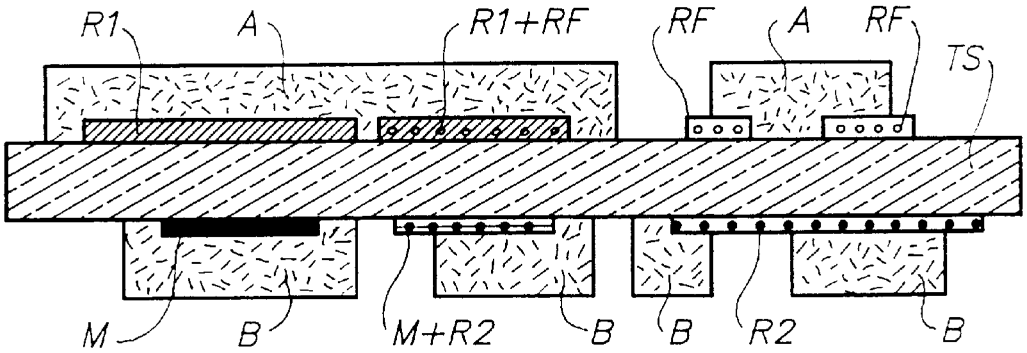

FIG. 4 represents a schematic sectional drawing of a security document according to the present invention wherein patterns containing light interference pigments A at one side of a transparent support TS are printed over (1) a pattern containing "common" light reflecting pigments R1 of which the color is complementary to the color of said pigments A when seen with reflected light, (2) a pattern comprising "common" light reflecting pigments R1 mixed with colored fluorescent or phosphorescent pigments or dyes RF, and (3) patterns containing solely fluorescent or phosphorescent dyes that may be white by inspection with visible light but emit colored light when exposed to ultraviolet light. At the other side of said support TS light interference pigments B are printed over (1') an opaque pattern containing metallic pigments (aluminium or bronze flakes) M, (2') a pattern comprising metallic pigments M mixed with "common" light reflecting pigments R2 having a color complementary to the color of said light interference pigments B when seen with reflected light, and (3') a pattern comprising solely light reflecting pigments R2 having a color complementary to the color of said light interference pigments B when seen with reflected light.

5. DETAILED DESCRIPTION OF THE INVENTION

A layer and/or pattern containing said light interference pigments (same or different) may be present at both sides of said transparent or translucent support.

The security document according to the present invention may contain in the same patterns and/or layer mixtures of different light interference pigments.

In a particular embodiment the support itself contains said light interference pigments and is produced e.g. by extruding a melt of a thermoplastic resin having homogeneously distributed therethrough one or more of said light interference pigments, or is produced by coating a resin solution having said pigment(s) dispersed therein followed after coating by the evaporation of the solvent(s) used.

An image or pattern present in said document may be formed by printing techniques including non-impact printing techniques and photographic techniques by which is understood herein that a visually inspectable image has been obtained in said document via a light-pattern transmitted or reflected by an original.

The document of the present invention by the presence of said interference pigments (including mixtures of said pigments) has at least in certain areas a different color when viewed with light transmitted by the document in comparison with light reflected by the document, and has at least in certain areas a different color when viewed in transmission mode from front or rear side. These properties form verification features that cannot be copied with common color copying machines and allow easy verification by the naked eye of the security document involved.

Preferred light interference pigments are titanium dioxide-coated mica or other metal-oxide coated pigments in which the metal oxide has preferably a refractive index comparable with the refractive index of $TiO_2$, e.g. $ZrO_2$, $Fe_2O_3$ or $Cr_2O_3$.

The platelets of metal oxide coated mica pigments have three layers in such a way that on each of the broad faces of the mica platelets a very thin coating of metal oxide is present.

The more brilliant interference pigments approach metallic luster, an effect that is enhanced by the presence of absorption colorants. $TiO_2$-mica readily lends itself to incorporation of absorption colorants. Ferric oxide ($Fe_2O_3$) added to the $TiO_2$ layer, for example imparts a yellow color which in conjunction with a yellow interference color creates gold. When $Fe_2O_3$ is used in place of $TiO_2$ as the oxide coating on mica, these pigments have a yellow-red absorption color because of the inherent color of the $Fe_2O_3$. They range from bronze to deep copper-red and have a metallic luster.

The preparation of such kind of pigments is described in in the already mentioned bulletin "Nacreous (Pearlescent) Pigments and Interference Pigments", p. 3–4.

Mica pigments serving as a substrate of the interference coatings are a group of hydrous aluminum silicate minerals with platy morphology and perfect basal (micaceous) cleavage. Examples of suitable micas are e.g. muscovite $KAl_2(AlSi_3O_{10})(OH)_2$, paragonite $NaAl_2(AlSi_3O_{10})(OH)_2$, phlogopite $K(Mg,Fe)(AlSi_3O_{10})(OH)_2$, biotite $K(Fe,Mg)(AlSi_3O_{10})(OH)_2$ and lepidolite $K(Li,Al)_{2.5-3.0}(Al_{1.0-0.5}Si_{3.0-3.5}O_{10})(OH)_2$ etc.

Details about the application of metal and/or metal oxide coatings on the mica platelets are further given in U.S. Pat. Nos. 3,087,827, 4,434,010 and 5,059,245 and in published EP-A-45 851, EP-A-313 280, DE-A-11 65 182, DE-A-32 37 264, DE-A-38 25 702 and DE-A-36 17 430 and DE-OS 41 41 069.

In a preferred embodiment according to the present invention interference pigments having a composition as described in published German patent application DE-OS 41 41 069 are used. Said interference pigments, called "Glanzpigmente" according to said DE-OS are composed of silicate platelets coated with either:

A) a first layer of highly refractive metal oxide, and

B) a second black layer essentially consisting of metallic iron, molybdenum and/or wolfram, or coated with:

A) a first layer of highly refractive metal oxide, and

B) a second black layer essentially consisting of carbon or metal, and

C) a third layer of highly refractive metal oxide.

By the presence of a semi-transparent carbon layer said platelets have a high chemical resistance. The carbon layer is obtained by thermal decomposition of oxygen-containing hydrocarbon compounds which for each two carbon atoms contain at least one oxygen atom e.g. as in carbohydrates such as sorbitol.

The metal layer B) can be formed in a medium of inert gas from in-gas-phase-decomposable metal compounds, e.g. metal carbonyl compounds, and the metal oxide layers A) and C) are formed by decomposition in gas phase of volatile metal compounds in the presence of oxygen water vapour or mixtures thereof.

The first layer A) consists e.g. of the oxides of titanium, zirconium, tin and/or iron.

Mica platelets double-side coated with one or more metal oxide layers for use as interference pigments are commercially available e.g. under the tradenames IRIODINE (E. Merck, Darmstadt), FLONAC (Kemira Oy. Pori, Finland), MEARLIN (The Mearl Corporation, New York, U.S.A.) and PALIOSECURE (BASF, Germany). Under these tradenames interference pigments showing violet, red, green, yellow and blue colors in reflected light at 90° are available on the market.

Holding an interference pigment-coated transparent support at 90° in a white light beam the transmitted light may be greyish-yellow to slightly brown which is a totally different color when seen in reflection (the main color). Such effect was seen as well in hydrophilic colloid coatings containing said pigments as in hydrophobic varnish layers. These differences of color in reflected and transmitted light cannot be photo-copied and form an easily detectable verification feature.

Moreover, looking at a coated blue interference pigment layer under different reflection angles the a blue color seen under a reflection angle of 90° will at a reflection angle smaller than 45° turn into yellow, green interference pigments obtain under these circumstances a greyish shade, whereas the violet and red pigments show a brownish-grey hue. In transparency inspection mode blue interference become brown yellow, magenta interference pigments turn green, and the green ones turn magenta.

Preferred interference platelet-type pigments for use according to the present invention have a largest surface diameter preferably between 5 and 200 $\mu$m and more preferably of 25 $\mu$m to 30 $\mu$m. The thickness of the platelet-type interference pigments is preferably between 0.1 $\mu$m and 0.6 $\mu$m and more preferably between 0.2 $\mu$m and 0.4 $\mu$m.

In order to obtain special verification effects under ultraviolet light exposure the interference pigments can be used in admixture with fluorescent or phosphorescent substances and optical brightening agents.

By way of example the light interference pigments A of the above drawings are blue light interference pigments such as PALIOSECURE (tradename of BASF-Germany) pigment code EC 1408 which shows when seen in reflection mode a vivid blue color. Seen in reflection their color changes in shade by changing the observation angle. When observed in transmission through said transparent substrate said blue pigments change their hue and the color becomes complementary to blue, i.e. yellow, slightly darkened with a brown shade that is probably due to very small impurities. A yellow light interference pigment such as IRIODINE (tradename of MERCK-Germany) pigment code 9331 has when observed in reflection mode a yellow color; seen in transmission the color of that pigment becomes complementary in color, i.e. blue. This is in accordance with the general property of light interference pigments of changing their color complementarily when changing their mode of viewing going from reflection to transmission mode.

Tests have been carried out in printing a security pattern on a transparent substrate in such a way that one part of a printing pattern was printed with blue light interference pigment (e.g. PALIOSECURE EC 1408 or FD 4187 of BASF-Germany) and another part was printed using a yellow interference pigment (e.g. IRIODINE 9231 of MERCK-Germany). By changing the viewing conditions from transmission to reflection mode the differently printed parts changed their color complementarily, so that the colors became inverted, which is as already been said, an effect that cannot be reproduced photographically by color copying machines. Common xerographic copying machines make prints against a white background (the color of the side of the cover of the machine contacting the original is white light reflecting). The light interference pigments that face the light source have high reflectance and show their normal color, whereas the "complementary" color is reproduced with transmitted light reflected by said cover.

Said property provides a strong security feature which makes e.g. that when a yellow light interference pigment background is surrounding an information pattern printed with a blue light interference pigment pattern a copying machine operating with transmitted light (that is reflected by its white cover) will provide a copy that has the printed information in yellow surrounded by a blue background which is the complementary in color from what can be seen directly in reflected light not passing through the document.

Further it has been found by us that when copying a transparent document printed with light interference pigments and overprinted with a fine guilloche design with common light reflecting pigment being no light interference pigment, the color of the guilloche pattern in the photocopy is different whether (1) the copy is made with the front side of the transparent document (original) directed towards the light source of the copying machine or (2) the copy is made with the light of said source directed through the rear of the transparent document towards the information pattern and image background at the front side receiving reflected light from the white light reflecting cover of the machine.

In the first case said "common" pigments contained in the guilloche pattern are reproduced with their inherent color and the light interference pigments are reproduced in the transmission mode in their complementary colors.

In the second case the photocopying machine does not see in reflected light the pattern of said "common" light reflecting pigments that have been printed on top of the light interference pigments so that they are not reproduced anymore, while the light interference pigments remain copied in their complementary color.

The "common" light reflecting pigments can be printed underneath or above the light interference pigments.

Thus, when in the above combination of information pattern and background a fine guilloche design having e.g. lines 3 microns wide, is printed with common yellow colored pigments (yellow light reflecting pigments) being no light interference pigments the differences between the copy and the original will become still more outspoken in that the color of the guilloche lines will be reproduced correctly but will not be detectable against the yellow pattern of light interference pigments seen by the copying machine.

In the embodiment illustrated in FIG. 3 the light reflecting pigments R can show a rainbow effect (are iridiscent) wherein one of their rainbow colors has the same hue as the color of the light interference pigments being printed on top.

In the embodiment illustrated in FIG. 4 the light reflecting colors showing rainbow effect (often used in security documents) are used in a printing ink containing metallic powder (e.g. aluminium or bronze). Printed underneath the light interference pigments the metallic powder being opaque blocks light and prevents copying of information present on the other side of the transparent support. Opacifying front and back images may be printed on top and/or underneath the patterns containing light interference pigments. The printing on both sides of the transparent support may be in perfect front/back registration using a therefor adapted printing machine such as a "Simultan Press" which is known for printing security documents.

When the design of the document is arranged in such a way that the light interference pigment pattern does not cover completely the printing pattern of the light reflecting pigments underneath, the observation in reflective mode shows the light reflecting pigments in their own color on the front or rear side of the document in the non-covered zone only. In the covered zone the light interference pigments show in reflective mode their main color.

On inspection in transmission mode (holding the document to the light) or copying with transmitted light the patterns of common light-reflecting pigments from front and rear side of the document are added (combined) and may form an uninterrupted area in the field of light interference pigments showing their own complementary color or combination of said complementary colors in overlapping zones, which may result in a continuous grey area where the complementary colors each represent a complementary part of the visible spectrum, as is the case e.g. by having in congruency a zone containing yellow-reflecting light interference pigments and a zone containing blue-reflecting light interference pigments.

Light interference pigments may be mixed with fluorescent or phosphorescent pigments without blocking the light emitted thereby. Light interference pigments have always some transparency together with their high specular reflectance.

According to one embodiment the above mentioned photographically obtained image or pattern is produced by means of a black-and-white or colour developed photosensitive silver halide directly in a light-sensitive material itself or in a non-light-sensitive image receiving material having a transparent support.

According to another embodiment the above mentioned photographically obtained image or pattern is produced by means of a non-impact printing technique in which analog or digital input signals for controlling the printing of said image or pattern stem from light-information originating from a visible original which light-information may be transformed into electrical signals that can be transduced and stored, e.g. on magnetic tape or optical disk. The visible original may be an object or living being or an already formed photograph of these.

A survey of non-impact printing techniques such as electro(photo)graphic printing, ink jet printing, photochemical printing and thermal transfer printing is given by Jerome L. Johnson in "Principles of Non Impact printing" Palatino Press—Irvine, Calif. U.S.A. (1986).

In accordance with an embodiment according to the present invention there is provided a document including a photographically obtained image or pattern and uniformly distributed interference pigments of a particular color are present in the document in combination with a printed pattern containing interference pigments of a color different from the color of the uniformly distributed interference pigments.

In accordance with another embodiment according to the present invention there is provided a document including a photographically obtained image or pattern and having at each side of its transparent or translucent support a layer wherein interference pigments are distributed uniformly, and wherein said layers at opposite sides of said support have a different color by the presence of different interference pigments.

In accordance with a further embodiment according to the present invention there is provided a document wherein uniformly distributed interference pigments are present in combination with pattern-wise printed colored common light-reflecting pigments or dyes or white light reflecting pigments, e.g. $TiO_2$. The color of the interference pigments under the copying angle is preferably the same as the color of said printed light-absorbing substances preventing thereby succesful photocopying of the printed information that remains still readable by the human eye under another observation angle.

According to still another embodiment in a document of the present invention a pattern of printed interference pigments is present underneath and/or on top of a layer or support having a color substantially the same as the color of said pattern containing said interference pigments when seen in reflection or transmission mode.

According to an embodiment in the security document according to the present invention different interference pigments are present uniformly each in a different layer at opposite sides of said support and at least one of said layers has underneath and/or on top a pattern containing common light-reflecting pigments and/or dyes having no light interference properties, and having preferably a color substantially the same as the color of at least one of the interference pigments when seen in reflection or transmission mode.

According to another embodiment in the security document according to the present invention at least one pattern containing common light-reflecting pigments and/or dyes is present which pattern is at least partly covered with a pattern containing interference pigments.

According to a further embodiment in the document according to the present invention the support has been coated directly by sputtering with a thin metal oxide layer or has been coated with said metal oxide layer on top of a coating or pattern of said light interference pigments and/or coating or pattern of light reflecting pigments having no light interference properties taking care that the thus coated metal oxide layer has substantially the same or color complementary to the color of said patternwise applied pigments.

According to a special embodiment the document according to the present invention has on the front and/or rear side of its support underneath and/or on top thereof uniformly or patternwise applied interference pigments in the form of a printed guilloche line pattern with rainbow effect, containing therefor light reflecting pigments showing that effect so as to have one or more of the rainbow colors the same as the normal or complementary color of said light interference pigments. In a particular case said one or more of the rainbow colors is obtained by printing metallic pigments.

In another embodiment fluorescent or phosphorescent pigments have been mixed with said light interference pigments and/or with said light reflecting pigments giving said rainbow effect to the guilloche pattern or said rainbow effect is obtained by printing a transparent varnish loaded with a fluorescent or phosphorescent pigment.

According to a still further embodiment the document according to the present invention contains (a) bi-fluorescent pigment(s) that is (are) mixed with one of said light reflecting pigments and/or mixed with said light interference pigments whereby when exposed to ultraviolet light said fluorescent pigment(s) show(s) light of two different wavelength ranges one of which is different from the wavelength range of the colors of said light reflecting and interference pigments when these are observed under visible light conditions and the other corresponds with the normal or complementary color of said interference pigments.

In a particular embodiment a guilloche pattern with rainbow effect is printed in perfect see-through print register on the front and rear side of the support; the light reflecting pigments showing rainbow effect printed at one side have complementary color with respect to the pigments printed, but have at one side a color the same as the normal color of said light interference pigments, and wherein parts of said guilloche pattern at either side cover at least partly a photograph or printed pattern or complete a printed pattern.

In a particularly interesting embodiment the document according to the present invention contains printed patterns at least partly covering each other and said patterns each contain (a) different light interference pigment(s) the construction and composition of which is such that they show a different color shift when viewed under the same observation angle, and wherein the printed pattern most remote from the observer has higher covering power than the pattern printed thereon which is more transparent, hereby obtaining a document that shows in the overlapping pattern area a continuously changing color shift by changing gradually the observation angle.

A layer containing uniformly distributed light interference pigments may be applied by coating a coating liquid containing said pigments in dispersed form and a dissolved binding agent or containing said pigments dispersed together with a binding agent in the form of a latex. After coating the solvent or dispersing liquid, e.g. water, is removed by evaporation. Any coating technique for the application of thin liquid layers may be used as is known e.g. from the field of the manufacture of photographic silver halide emulsion layer materials, e.g. doctor blade coating, gravure roller coating, meniscus coating, air knife coating, slide hopper coating and spraying.

According to a special coating technique the light interference pigments are applied in a radiation-curable binder or binder system wherein e.g. monomers act as solvent for polymers or prepolymers as described e.g. in published EP-A 0 522 609. so that after coating of the liquid coating composition no solvent has to be evaporated.

In accordance with a particular embodiment uniformly distributed interference pigments are applied in a layer that is transferred by a stripping-off procedure to built the document of the present invention. Such procedure is described in published EP-A 0 478 790 but is applied therein for controlling the whiteness of an image present on a permanent support using for the stripping-off and transfer procedure a temporary support coated with a wet-strippable non-photosensitive layer containing fluorescent whitening agent(s) in a hydrophilic colloid binder.

According to a special embodiment the light interference pigments are applied in the form of a pigment-transfer-foil wherefrom by hot transfer the pigments are transferred uniformly onto the substrate of the security document.

Still another coating technique suited for uniformly applying said pigments is by dry powder-spraying optionally on a hot-melt resin layer wherein they are impregnated by pressure and heat. On top of the pigments an adhesive, e.g. wax may be applied to improve adherence to the selected substrate. That substrate may have hydrophilic or hydrophobic surface properties.

Spray-coating may be applied for covering the whole surface of the substrate or only a part thereof producing "light interference rainbow-effects". By using varying mixtures of different interference pigments the intensity of one color can be made to decrease gradually while an increasing color intensity of another pigment comes up. The human eye will see the rainbow effect varying according to the perception angle and will recognize the basic color of each of the sprayed pigments, but a photocopier operating with a fixed copying angle will only reproduce, say a single yellowish-brown color and not the colors of the interference pigments that can be seen under different inspection angles.

The interference pigments can be used for pigmenting a commercial coating varnish which may then be used for pre-coating a security document substrate, e.g. opaque resin film or paper. The coating may proceed with common varnishing or impregnation machinery instead of using printing presses.

As already mentioned herein the uniformly applied interference pigments ore advantageously combined with image-wise or pattern-wise applied interference pigments of another color.

The image-wise or pattern-wise application of interference pigments proceeds e.g. by printing with an ink containing said pigments. Suited printing processes are e.g. planographic offset printing, gravure printing, intaglio printing, screen printing, flexographic printing, relief printing, tampon printing, ink jet printing and toner-transfer printing from electro(photo)graphic recording materials.

For use in printing on hydrophilic layers or substrates the ink contains for example a 15 to 20% by weight mixture of the interference pigments in a solution of cellulose nitrate in a polyethylene ether. Such ink has a good adherence on hydrophilic colloid layers such as gelatin-containing layers used in DTR-recording materials. Said ink is advantageously applied with a commercial screen press using a polyester screen with a 77 and 55 mesh. The interference colors gradually appear on drying the ink.

Thus applied ink patterns on a hydrophilic image-receiving layer for DTR-image production remain unchanged during DTR-processing.

The presence of the light interference pigments in one of the layers of the opaque security document does not affect the possibility to print thereon further graphic or alpha-numerical information by any known printing technique.

For easy visual verification the light interference pigments are present preferably in a security document in a coverage of 0.3 $g/m^2$ to 10 $g/m^2$ and more preferably in a coverage between 0.7 $g/m^2$ and 3 $g/m^2$.

The printing of a light interference pigment-containing pattern may proceed on a substrate already covered e.g. by a hologram. light-diffraction pattern, metallic pattern that can be viewed throught the printed pattern so that the properties of the interference pigments are added thereto.

The printed pattern containing interference pigments forms no obstacle for a good adherence with laminated plastic resinous covering material. By proper selection of the binder of the ink it can be co-melted with the resin material laminated thereto.

According to a particular embodiment the light interference pigment-containing ink is applied on a temporary support. e.g. polystyrene support, wherefrom the ink layer can be stripped off and transferred to a permanent support. e.g. a glued and preprinted substrate of a security document. The ink layer, applied overall or pattern-wise, after leaving the temporary support covers underlying pre-printed data on the permanent support. For preventing fraudulent copying these data have the same color as the interference pigment layer when seen under the copying angle. Insufficient image contrast is available so that copying of the pre-printed data is no longer possible. By applying a dried interference pigment-containing ink layer that is translucent the underlying data can be visually inspected therethrough by altering the perception angle.

In accordance with the preceding embodiment a security document according to the present invention. e.g. serving as I.D. card. is preferably in the form of a laminate in which the information-containing layer(s) are sealed between protective resinous sheets. I.D. card laminates may be built up as described e.g. in U.S. Pat. No. 4,101,701, U.S. Pat. No. 4,762,759, U.S. Pat. No. 4,902,593, published EP-A 0 348 310 and published EP-A 0 462 330. By lamination tamper-proof documents are produced which do not allow the opening of the laminate without damaging the image contained therein. The destruction of the seal will leave visual fraud traces on the security document.

In accordance with a first mode in the security document according to the present invention a black-and-white photograph in the form of a silver image is formed by the silver salt diffusion transfer process, called herein DTR-process. According to said process dissolved silver halide salt is transferred imagewise in a special image receiving layer, called development nuclei containing layer, for reducing therein transferred silver salt, said development nuclei containing layer contains itself and/or in an overlaying and/or an underlaying layer uniformly distributed therein said interference pigments.

The light interference pigments may be present either in the image-receiving layer itself and/or in a waterpermeable top layer and/or in a subbing layer covering the support.

The presence of a dried water-impermeable ink pattern on the image-receiving layer blocks DTR-image formation. Thereby it is possible to arrange e.g. fine line patterns such as guilloches in the photograph creating that way an additional verification feature.

The principles of the DTR-process are described in U.S. Pat. No. 2,352,014 of André Rott, issued Jun. 20, 1944. According to said process silver complexes are image-wise transferred by diffusion from a silver halide emulsion layer to an image-receiving layer, where they are converted, in the presence of development nuclei into a silver image. For this purpose, an image-wise exposed silver halide emulsion layer is developed by means of a developing substance in the presence of a so-called silver halide solvent. In the exposed parts of the silver halide emulsion layer the silver halide is developed to metallic silver so that it cannot dissolve anymore and consequently cannot diffuse. In the non-exposed parts of the silver halide emulsion layer the silver halide is converted into soluble silver complexes by means of a silver halide complexing agent, acting as silver halide solvent, and said complexes are transferred by diffusion into an image-receiving layer being in waterpermeable contact with said emulsion layer to form by the catalytic action of said development nuclei, in so-called physical development, a silver-containing image in the image-receiving layer.

More details on the DTR-process can be found in "Photographic Silver Halide Diffusion Processes" by A. Rott and E. Weyde, Focal Press, London, New York (1972).

In accordance with a second mode in the opaque security document according to the present invention a color photograph in the form of one or more dye images is formed by the dye diffusion transfer process (dye DTR-process) wherein the image-wise transfer of dye(s) is controlled by the development of (a) photo-exposed silver halide emulsion layer(s) and wherein dye(s) is (are) transferred imagewise in a special image receiving layer, called mordant layer, for fixing the dyes, said mordant layer and/or an overlaying and/or an underlaying layer containing uniformly distributed therethrough said interference pigments.

Dye diffusion transfer reversal processes are based on the image-wise transfer of diffusible dye molecules from an image-wise exposed silver halide emulsion material into a waterpermeable image-receiving layer containing a mordant for the dye(s). The image-wise diffusion of the dye(s) is controlled by the development of one or more image-wise exposed silver halide emulsion layers, that for the production of a multicolor image are differently spectrally sensitized and contain respectively a yellow, magenta and cyan dye molecules. A survey of dye diffusion transfer imaging processes has been given by Christian C. Van de Sande in Angew. Chem.—Ed. Engl. 22 (1983) n° 3, 191–209 and a particularly useful process is described in U.S. Pat. No. 4,496,645.

For use in dye diffusion transfer photography the type of mordant chosen will depend upon the dye to be mordanted. If acid dyes are to be mordanted, the image-receiving layer being a dye-mordanting layer contains basic polymeric mordants such as polymers of amino-guanidine derivatives of vinyl methyl ketone such as described in U.S. Pat. No. 2,882,156, and basic polymeric mordants and derivatives, e.g. poly-4-vinylpyridine, the metho-p-toluene sulphonate of poly-2-vinylpyridine and similar compounds described in U.S. Pat. No. 2,484,430, and the compounds described in the published DE-A 2,009,498 and 2,200,063. Other mordants are long-chain quaternary ammonium or phosphonium compounds or ternary sulphonium compounds, e.g. those described in U.S. Pat. Nos. 3,271,147 and 3,271,148,, and cetyltrimethyl-ammonium bromide. Certain metal salts and their hydroxides that form sparingly soluble compounds with the acid dyes may be used too. The dye mordants are dispersed or molecularly divided in one of the usual hydrophilic binders in the image-receiving layer, e.g. in gelatin, polyvinylpyrrolidone or partly or completely hydrolysed cellulose esters.

In U.S. Pat. No. 4,186,014 cationic polymeric mordants are described that are particularly suited for fixing anionic dyes, e.g. sulphinic acid salt dyes that are image-wise released by a redox-reaction described e.g. in in published EP-A 0,004,399 and U.S. Pat. No. 4,232,107.

The DTR process can be utilized for reproducing line originals e.g. printed documents, as well as for reproducing continuous tone originals, e.g. portraits.

By the fact that the DTR-image is based on diffusion transfer of imaging ingredients the image-receiving layer and optionally present covering layer(s) have to be water-permeable.

The reproduction of black-and-white continuous tone images by the DTR-process requires the use of a recording material capable of yielding images with considerable lower gradation than is normally applied in document reproduction to ensure the correct tone rendering of continuous tones of the original. In document reproduction silver halide emulsion materials are used which normally mainly contain silver chloride. Silver chloride not only leads to a more rapid development but also to high contrast.

In U.S. Pat. No. 3,985,561. to be read in conjunction herewith, a light-sensitive silver halide material is described wherein the silver halide is predominantly chloride and this material is capable of forming a continuous tone image on or in an image-receiving material by the diffusion transfer process.

According to said U.S. patent a continuous tone image is produced by the diffusion transfer process in or on an image-receiving layer through the use of a light-sensitive layer which contains a mixture of silver chloride and silver iodide and/or silver bromide dispersed in a hydrophilic colloid binder e.g. gelatin, wherein the silver chloride is present in an amount of at least 90 mole % based on the total mole of silver halide and wherein the weight ratio of hydrophilic colloid to silver halide, expressed as silver nitrate, is between 3:1 and about 10:1 by weight.

With these light-sensitive materials successful reproduction of continuous tone images can be obtained probably as a result of the presence of the indicated amounts of silver iodide and/or silver bromide and of the defined high ratio of hydrophillic colloid to silver halide.

According to U.S. Pat. No. 4,242,436 likewise to be read in conjunction herewith, the reproduction of continuous tone images can be improved by developing the photographic material with a mixture of developing agents comprising an o-dihydroxybenzene. e.g. catechol, a 3-pyrazolidinone e.g. a 1-aryl-3-pyrazolidinone and optionally a p-dihydroxybenzene, e.g. hydroquinone, the molar amount of the o-dihydroxybenzene in said mixture being larger than the molar amount of the 3-pyrazolidinone, and the p-dihydroxybenzene if any being present in a molar ratio of at most 5% with respect to the o-dihydroxybenzene.

Suitable development nuclei for use in the above mentioned physical development in the image receiving layer are e.g. noble metal nuclei e.g. silver, palladium, gold, platinum, sulphides, selenides or tellurides of heavy metals such as Pd, Ag, Ni and Co. Preferably used development nuclei are colloidal PdS, $Ag_2S$ or mixed silver-nickelsulphide particles. The amount of nuclei used in the image receiving layer is preferably between 0.02 $mg/m^2$ and 10 $mg/m^2$.

The image receiving layer comprises for best imaging results the physical development nuclei in the presence of a protective hydrophilic colloid, e.g. gelatin and/or colloidal silica, polyvinyl alcohol etc.

The transfer behaviour of the complexed silver largely depends on the thickness of the image-receiving layer and the kind of binding agent or mixture of binding agents used in the nuclei containing layer. In order to obtain a sharp image with high spectral density the reduction of the silver salts diffusing into the image receiving layer must take place rapidly before lateral diffusion becomes substantial. An image-receiving material satisfying said purpose is described in U.S. Pat. No. 4,859,566.

An image-receiving material of this type is very suitable for use in connection with the present invention and contains a water-impermeable support coated with (1) an image-receiving layer containing physical development nuclei and interference pigments dispersed in a waterpermeable binder and (2) a waterpermeable top layer free from development nuclei and containing a hydrophilic colloid, in such a way that:

(i) the total solids coverage of said two layers (1) and (2) is e.g. at most 2 $g/m^2$.

(ii) in layer (1) the coverage of the nuclei is in the range of 0.1 $mg/m^2$ to 10 $mg/m^2$, and the coverage of binder is in the range of 0.4 to 1.5 $g/m^2$, and (iii) in said top layer (2) the coverage of hydrophilic colloid is in the range of 0.1 to 0.9 $g/m^2$.

The coating of said layers proceeds preferably with slide hopper coater or curtain coater known to those skilled in the art.

According to a particular embodiment the nuclei containing layer (1) is present on a nuclei-free underlying hydrophilic colloid undercoat layer or undercoat layer system having a coverage in the range of 0.1 to 1 $g/m^2$ of hydrophilic colloid, the total solids coverage of layers (1) and (2) together with the undercoat being at most 2 $g/m^2$. In connection with this embodiment the nacreous pigments may be also be included in the undercoat layer or may be included therein instead of being present in the nuclei containing layer.

The undercoat optionally incorporates substances that improve the image quality, e.g. incorporates a substance improving the image-tone or the whiteness of the image background. For example, the undercoat may contain a fluorescent substance, silver complexing agent(s) and/or development inhibitor releasing compounds known for improving image sharpness.

According to a special embodiment the image-receiving layer (1) is applied on an undercoat playing the role of a timing layer in association with an acidic layer serving for the neutralization of alkali of the image-receiving layer. By the timing layer the time before neutralization occurs is established, at least in part, by the time it takes for the alkaline processing composition to penetrate through the timing layer. Materials suitable for neutralizing layers and timing layers are disclosed in Research Disclosure July 1974, item 12331 and July 1975, item 13525.

In the image-receiving layer (1) and/or in said top layer (2) and/or in an alkali-neutralizing undercoat gelatin is used preferably as hydrophilic colloid. In layer (1) gelatin is present preferably for at least 60% by weight and is optionally used in conjunction with an other hydrophilic colloid. e.g. polyvinyl alcohol, cellulose derivatives, preferably carboxymethyl cellulose, dextran, gallactomannans, alginic acid derivatives, e.g. alginic acid sodium salt and/or water-soluble polyacrylamides. Said other hydrophilic colloid may be used also in the top layer for at most 10% by weight and in the undercoat in an amount lower than the gelatin content.

The image-receiving layer and/or a hydrophilic colloid layer in water-permeable relationship therewith may comprise a silver halide developing agent and/or silver halide solvent, e.g. sodium thiosulphate in an amount of approximately 0.1 g to approximately 4 g per $m^2$.

The image-receiving layer or a hydrophilic colloid layer in water-permeable relationship therewith may comprise colloidal silica.

The image-receiving layer may contain as physical development accelerators, in operative contact with the developing nuclei, thioether compounds such as those described e.g. in DE-A-1,124,354; U.S. Pat. No. 4,013,471: U.S. Pat. No. 4,072,526 and in EP 26520.

According to a preferred embodiment the processing liquid and/or the DTR image-receiving material contains at least one image toning agent. In said case the image toning agent(s) may gradually transfer by diffusion from said image-receiving material into the processing liquid and keep therein the concentration of said agents almost steady. In practice such can be realized by using the silver image toning agents in a coverage in the range from 1 $mg/m^2$ to 20 $mg/m^2$ in a hydrophilic waterpermeable colloid layer.

A survey of suitable toning agents is given in the above mentioned book of André Rott and Edith Weyde, p. 61–65, preference being given to 1-phenyl-1H-tetrazole-5-thiol, also called 1-phenyl-5-mercapto-tetrazole, tautomeric structures and derivatives thereof such as 1-(2,3-dimethylphenyl)-5-mercapto-tetrazole, 1-(3,4-dimethylcyclohexyl)-5-mercapto-tetrazole, 1-(4-methylphenyl)-5-mercapto-tetrazole, 1-(3-chloro-4-methylphenyl)-5-mercapto-tetrazole, 1-(3,4-dichlorophenyl)-5-mercapto-tetrazole. Further particularly useful toning agents are of the class of thiohydantoins and of the class of phenyl substituted mercapto-triazoles. Still further toning agents suitable for use in accordance with the preferred embodiment of the present invention are the toning agents described in published European patent applications 218752, 208346, 218753 and U.S. Pat. No. 4,683,189.

In the security documents according to the present invention the transparent or translucent support is e.g. a clear resin film support or such support containing small amounts of pigments or voids opacifying to some degree the support. For example, white $TiO_2$ particles as described e.g. in published European patent application (EP-A) 0 324 192 are incorporated therein.

Organic resins suited for manufacturing transparent film supports are e.g. polycarbonates, polyesters, preferably polyethylene terephthalate, polystyrene and homo- and copolymers of vinyl chloride. Further are mentioned cellulose esters e.g. cellulose triacetate.

The above mentioned DTR image-receiving materials may be used in conjunction with any type of photosensitive material containing a silver halide emulsion layer. For continuous tone reproduction the silver halide comprises preferably a mixture of silver chloride, and silver iodide and/or silver bromide at least 90 mole % based on the total mole of the silver halide being silver chloride, and the ratio by weight of hydrophillic colloid to silver halide expressed as silver nitrate is between 3:1 and 10:1.

The binder for the silver halide emulsion layer and other optional layers contained on the imaging element is preferably gelatin. But instead of or together with gelatin, use can be made of one or more other natural and/or synthetic hydrophilic colloids, e.g. albumin, casein, zein, polyvinyl alcohol, alginic acids or salts thereof, cellulose derivatives such as carboxymethyl cellulose, modified gelatin. e.g. phthaloyl gelatin etc. The weight ratio in the silver halide emulsion layer of hydrophilic colloid binder to silver halide expressed as equivalent amount of silver nitrate to binder is e.g. in the range of 1:1 to 10:1, but preferably for continuous tone reproduction is between 3.5:1 and 6.7:1.

The silver halide emulsions may be coarse or fine grain and can be prepared by any of the well known procedures e.g. single jet emulsions, double jet emulsions such as Lippmann emulsions, ammoniacal emulsions, thiocyanate- or thioether-ripened emulsions such as those described in U.S. Pat. Nos. 2,222,264, 3,320,069, and 3,271,157. Surface image emulsions may be used or internal image emulsions may be used such as those described in U.S. Pat. Nos. 2,592,250, 3,206,313, and 3,447,927. If desired, mixtures of surface and internal image emulsions may be used as described in U.S. Pat. No. 2,996,382.

The silver halide particles of the photographic emulsions may have a regular crystalline form such as cubic or octahedral form or they may have a transition form. Regular-grain emulsions are described e.g. in J. Photogr. Sci., Vol. 12, No. 5, September/October 1964. pp. 242–251. The silver halide grains may also have an almost spherical form or they may have a tabular form (so-called T-grains), or may have composite crystal forms comprising a mixture of regular and irregular crystalline forms. The silver halide grains may have a multilayered structure having a core and shell of different halide composition. Besides having a differently composed core and shell the silver halide grains may comprise also different halide compositions and metal dopants inbetween.

The average size expressed as the average diameter of the silver halide grains may range from 0.2 to 1.2 um, preferably between 0.2 $\mu$m and 0.8 $\mu$m, and most preferably between 0.3 $\mu$m and 0.6 $\mu$m. The size distribution can be homodisperse or heterodispere. A homodisperse size distribution is obtained when 95% of the grains have a size that does not deviate more than 30% from the average grain size.

The emulsions can be chemically sensitized e.g. by adding sulphur-containing compounds during the chemical ripening stage e.g. allyl isothiocyanate, allyl thiourea, and sodium thiosulphate. Also reducing agents e.g. the tin compounds described in BE-A 493,464 and 568,687, and polyamines such as diethylene triamine or derivatives of aminomethane-sulphonic acid can be used as chemical sensitizers. Other suitable chemical sensitizers are noble metals and noble metal compounds such as gold, platinum, palladium, iridium, ruthenium and rhodium. This method of chemical sensitization has been described in the article of R.KOSLOWSKY, Z. Wiss. Photogr. Photophys. Photochem. 46, 65–72 (1951).

The emulsions can also be sensitized with polyalkylene oxide derivatives, e.g. with polyethylene oxide having a molecular weight of 1000 to 20,000, or with condensation products of alkylene oxides and aliphatic alcohols, glycols, cyclic dehydration products of hexitols, alkyl-substituted phenols, aliphatic carboxylic acids, aliphatic amines, aliphatic diamines and amides. The condensation products have a molecular weight of at least 700, preferably of more than 1000. It is also possible to combine these sensitizers with each other as described in BE-P 537,278 and GB-P 727,982.

The silver halide emulsion may be sensitized panchromatically to ensure reproduction of all colors of the visible part of the spectrum or it may be orthochromatically sensitized.

The spectral photosensitivity of the silver halide can be adjusted by proper spectral sensitization by means of the usual mono- or polymethine dyes such as acidic or basic cyanines, hemicyanines, oxonols, hemioxonols, styryl dyes or others, also tri- or polynuclear methine dyes e.g. rhodacyanines or neocyanines. Such spectral sensitizers have been described by e.g. F. M. HAMER in "The Cyanine Dyes and Related Compounds" (1964) Interscience Publishers, John Wiley & Sons, New York.

The silver halide emulsions may contain the usual stabilizers e.g. homopolar or salt-like compounds of mercury with aromatic or heterocyclic rings such as mercaptotriazoles, simple mercury salts, sulphonium mercury double salts and other mercury compounds. Other suitable stabilizers are azaindenes, preferably tetra- or penta-azaindenes, especially those substituted with hydroxy or amino groups. Compounds of this kind have been described by BIRR in Z. Wiss. Photogr. Photophys. Photochem. 47, 2–27 (1952). Other suitable stabilizers are i.a. heterocyclic mercapto compounds e.g. phenylmercaptotetrazole, quaternary benzothiazole derivatives, and benzotriazole.

A survey of photographic silver halide emulsions and their preparation is given in Research Disclosure December 1989, item 308119.

Processing of the image-wise exposed photographic silver halide emulsion layer proceeds whilst in contact with an image receiving material according to the invention and is accomplished using an alkaline processing liquid having a pH preferably between 9 and 13. The pH of the alkaline processing liquid may be established using various alkaline substances. Suitable alkaline substances are inorganic alkali e.g. sodium hydroxide, potassium carbonate or alkanolamines or mixtures thereof. Preferably used alkanolamines are tertiary alkanolamines e.g. those described in EP-A-397925, EP-A-397926, EP-A-397927, EP-A-398435 and U.S. Pat. No. 4,632,896. A combination of alkanolamines having both a $pk_a$ above or below 9 or a combination of alkanolamines whereof at least one has a $pk_a$ above 9 and another having a $pk_a$ of 9 or less may also be used as disclosed in the Japanese patent applications laid open to the public numbers 73949/61, 73953/61, 169841/61, 212670/60, 73950/61, 73952/61, 102644/61, 226647/63, 229453/63, U.S. Pat. No. 4,362,811, U.S. Pat. No. 4,568,634 etc. The concentration of these alkanolamines is preferably from 0.1 mol/l to 0.9 mol/l.

Suitable developing agents for the exposed silver halide are e.g. hydroquinone-type and 1-phenyl-3-pyrazolidone-type developing agents as well as p-monomethylaminophenol and derivatives thereof. Preferably used is a combination of a hydroquinone-type and 1-phenyl-3-pyrazolidone-type developing agent wherein the latter is preferably incorporated in one of the layers comprised on the support of the photographic material. A preferred class of 1-phenyl-3-pyrazolidone-type developing agents is disclosed in the published EP-A 449340.

According to a preferred embodiment for continuous tone reproduction a mixture of developing agents comprising an o-dihydroxybenzene, e.g. catechol, a 3-pyrazolidinone e.g. a 1-aryl-3-pyrazolidinone and optionally a p-dihydroxybenzene, e.g. hydroquinone the molar amount of the o-dihydroxybenzene in said mixture being larger than the molar amount of the 3-pyrazolidinone, and the p-dihydroxybenzene if any being present in a molar ratio of at most 5% with respect to the o-dihydroxybenzene can be used. Other type of developing agents suitable for use in accordance with the present invention are reductones e.g. ascorbic acid derivatives.

The developing agent or a mixture of developing agents can be present in an alkaline processing solution, in the photographic material or the image receiving material. In case the developing agent or a mixture of developing agents is contained in the photographic material and/or image receiving material, the processing solution can be merely an aqueous alkaline solution that initiates and activates the development.

In the DTR process the photographic element is developed in the presence of a silver halide solvent. Preferably used silver halide solvents are water soluble thiosulphate compounds such as ammonium and sodium thiosulphate, or ammonium and alkali metal thiocyanates. Other useful silver halide solvents (or "complexing agents") are described in the book "The Theory of the Photographic Process" edited by T. H. James, 4th edition, p. 474–475 (1977), in particular sulphites and uracil. Further interesting silver halide complexing agents are cyclic imides, preferably combined with alkanolamines, as described in U.S. Pat. No. 4,297,430 and U.S. Pat. No. 4,355,090. 2-mercaptobenzoic acid derivatives are described as silver halide solvents in U.S. Pat. No. 4,297,429, preferably combined with alkanolamines or with cyclic imides and alkanolamines. Dialkylmethylenedisulfones can also be used as silver halide solvent.

The silver halide solvent is preferably present in the processing solution but may also be present in one or more layers comprised on the support of the imaging element and/or receiving material. When the silver halide solvent is incorporated in the photographic material it may be incorporated as a silver halide solvent precursor as disclosed in e.g. Japanese published unexamined patent applications no. 15247/59 and 271345/63, U.S. Pat. No. 4,693,955 and U.S. Pat. No. 3,685,991.

The processing solution for use in the production of black-and-white photographs in security documents according to the present invention may comprise other additives such as e.g. thickeners, preservatives, detergents e.g. acetylenic detergents such as SURFYNOL 104, SURFYNOL 465, SURFYNOL 440 etc. all available from Air Reduction Chemical Company, New York.

The DTR-process is normally carried out at a temperature in the range of 10° C. to 35° C.

Further details about the black-and-white DTR process and also about the dye diffusion transfer process and image receiving materials used therein are described in Research Disclosure November 1976, item 15162.

The present invention will now be illustrated by the following examples without however limiting it thereto. All ratios, percentages and parts are by weight unless otherwise specified.

EXAMPLE 1

Preparation of Photographic Element for Use in the DTR Process

A gelatino silver halide emulsion was prepared by slowly running with stirring an aqueous solution of 1 mole of silver nitrate per liter into a gelatine solution containing per mole of silver nitrate 41 g of gelatin, 1.2 mole of sodium chloride. 0.08 mole of potassium bromide and 0.01 mole of potassium iodide.

The temperature during precipitation and the subsequent ripening process lasting three hours was kept at 40° C.

Before cooling, shredding and washing 214 g of gelatin were added per mole of silver halide. The washed noodles were molten and another 476 g of gelatin were added per mole of silver halide during the chemical ripening. After ripening 285 g of gelatin in the form of a 20% aqueous solution were added to the emulsion per mole of silver halide as well as hydroquinone in an amount such that after coating 0.9 g of hydroquinone were present per $m^2$ and 1-phenyl-4,4-dimethyl-3-pyrazolidinone in an amount such that 0.21 g thereof were present per $m^2$. The emulsion was coated at one side of a subbed water-resistant paper support consisting of a paper having a weight of 110 $g/m^2$ coated at both sides with a polyethylene stratum at a ratio of 20 $g/m^2$ per side.

The emulsion was coated in such a way that an amount of silver equivalent to 1.5 g of silver nitrate was applied per $m^2$. The amount of gelatin corresponding therewith is 8.93 $g/m^2$ since the gelatin to silver nitrate weight ratio was 5.97.

Preparation of Image Receiving Material for Use in the DTR Process and Containing Light Interference Pigments One side of a double-side subbed transparent polyethylene terephthalate support having a thickness of 0.1 mm was coated after corona treatment at a dry coverage of 2.5 $g/m^2$ of gelatin and 1.3 $g/m^2$ of interference pigment from the following coating composition:

| | |
|---|---|
| carboxymethyl | 12 g |
| gelatin | 38.5 g |
| 3% aqueous dispersion of colloidal $Ag_2S.NiS$ nuclei | 14 ml |
| 4% aqueous solution of formaldehyde | 12 ml |
| aqueous dispersion of blue PALIOSECURE type EC 1408 (tradename) containing 30% of said blue pigment and 8% of gelatin | 80 g |
| 12.5% solution of saponine in ethanol/water (20/80) | 20 ml |

The other side of said support was coated with the above mentioned image-receiving layer coating composition, with the difference however, that the blue interference pigment PALIOSECURE type EC 1408 (tradename) pigment was replaced by yellow interference pigment IRIODINE 9231 (tradename).

Printing of the Image Receiving Material With Pattern of Graphical and Numerical Information Using a Blue Non-iridiscent Ink The printing of said information was carried out in the background area having a yellow color (on observation in reflection mode) due to the presence of said interference pigment IRIODINE 9231 (tradename).

DTR-image Formation

The above defined photographic element was image-wise exposed in a reflex camera to obtain therein a photograph (portrait) of the passport owner.

The photo-exposed element was pre-moistened with a processing liquid as defined hereinafter.

The contact time of the photo-exposed element with said liquid was 6 seconds before being pressed together with the image-receiving material at the blue-pigment side as defined above. The transfer processor employed was a COPYPROOF (registered trade name of AGFA-GEVAERT N.V.) type CP 380. The transfer contact time was 30 seconds. In the image-receiving layer a positive black-and-white (silver image) portrait of the photographed person was obtained.

Composition of the Processing Liquid

| | |
|---|---|
| hydroxyethyl cellulose | 1.0 g |
| Ethylenediaminetetraacetic acid tetrasodium salt | 2.0 g |
| $Na_2SO_3$ | 45.0 g |
| $Na_2S_2O_3$ | 14.0 g |
| KBr | 0.5 g |
| 1-Phenyl-5-mercapto-tetrazole | 0.1 g |
| 1-(3,4-Dichlorophenyl)-1H-tetrazole-5-thiol | 0.02 g |
| N-methyl-ethanolamine | 45.0 ml |
| N-methyl-diethanolamine | 30.0 ml |
| Water up to | 1 l |

When viewed in daylight under an angle of 90° in reflection mode the color of the non-printed area around the portrait (inspection at the front side) was blue due the presence of uniformly distributed therein PALIOSECURE type En 1408-BLUE (tradename). In the transmission mode the color in that background area became slightly brownish yellow at the front side and blue at the rear side.

On copying the obtained document with a color copier (CANON CLC 500) the parts of the document around the portrait were reproduced grey (yellow plus blue) having the blue printed graphical information of non-iridiscent pigment with poor contrast thereon.

EXAMPLE 2

Preparation of Image-receiving Element for Use in Dye Diffusion Transfer Process A transparent polyvinyl chloride sheet having a thickness of 0.100 mm was after corona treatment coated at one side with the following compositions for forming a subbing layer and mordanting layer respectively:

1. Subbing Layer Coating Composition

| | |
|---|---|
| gelatin | 4 g |
| aqueous dispersion of blue FALIOSECURE type EC 1408 (tradename) containing 30% of said blue pigment and 8% of gelatin | 200 g |
| ingredient A 40% solution dispersed in aqueous medium | 250 ml |
| 5% solution of siloxane compound in ethanol | 125 ml |
| 12.5% solution of saponine in ethanol/water 20/80 | 20 ml |

Ingredient A is a polyester-polyurethane having the same chemical composition as described in U.S. Pat. No. 4,902,593, column 2, lines 64–68 and column 3, lines 1–8.

The coating composition was applied coated at a dry coverage of 0.4 $g/m^2$ of gelatin and 1.2 g of interference pigment.

2. Coating Composition of the Mordanting Layer

| | |
|---|---|
| gelatin | 20 g |
| mordant M (20% solution) | 250 ml |
| saponine (12%) and wetting agent W (5%) in water | 32 ml |
| aqueous 4% solution of formaldehyde | 10 ml |

Mordant M on the basis of an epoxidized cationic polymer has the same composition as described in U.S. Pat. No. 4,902,593. column 7, lines 14–42.

The coating composition was applied at a dry coverage of 0.9 $g/m^2$ of gelatin.

The other side of said support was coated with the above mentioned image-receiving layer coating composition, with the difference however, that the blue interference pigment PALIOSECURE type EC 1408 (tradename) pigment was replaced by yellow interference pigment IRIODINE 9231 (tradename).

The above defined image-receiving material was processed in combination with a photographic dye diffusion transfer material as described in the Example of U.S. Pat. No. 4,496,645, which material was exposed to reproduce thereon a portrait. The exposed material was kept for 1 minute in contact with the above defined image-receiving material after being led through a diffusion transfer apparatus COPYPROOF CP 38 (tradename of Agfa-Gevaert N.V. Belgium) having in its tray the following basic processing liquid

| | |
|---|---|
| sodium hydroxide | 25 g |
| sodium orthophosphate | 25 g |
| cyclohexane dimethanol | 25 g |
| 2,2' methylpropylpropane diol | 25 g |
| N-ethylbenzene-pyridinium chloride | 0.5 g |
| distilled water up to | 1000 ml |

After leaving the processing tray the image-receiving sheet was led through a second tray containing an aqueous solution of the already mentioned wetting agent W corresponding with the following formula: iso-nonyl-phenoxy-$(CH_2—CH_2—O)_9$—H and potassium iodide (ref. EP 0250657).

After drying the processed sheet material it was laminated as described in U.S. Pat. No. 4,902,593 to obtain a sealed I.D. card.

EXAMPLE 3

The interference pigments mentioned in Example 2 were applied uniformly in front and rear mordanting layers respectively instead of in the subbing layers of an image-receiving material suited for use in a dye diffusion transfer process.

Preparation of the Image-Receiving Element

A transparent polyvinyl chloride sheet having a thickness of 0.100 mm was after corona treatment coated at one side with the following compositions for forming a subbing layer and mordanting layer respectively:

1. Coating Composition of the Subbing Layer

| | |
|---|---|
| gelatin | 20 g |
| ingredient A 40% solution dispersed in aqueous medium | 250 ml |
| 5% solution of siloxane compound in ethanol | 125 ml |
| 12.5% solution of saponine in ethanol/water 20/80 | 20 ml |

The coating composition was applied coated at a dry coverage of 0.4 $g/m^2$ of gelatin. 2. Coating Composition of the Front Mordanting Layer

| | |
|---|---|
| gelatin | 12 g |
| aqueous dispersion of blue PALIOSECURE type EC 1408 (tradename) containing 30% of said blue pigment and 8% of gelatin | 100 g |

-continued

| | |
|---|---|
| mordant M (20% solution) | 250 ml |
| saponine (12%) and wetting agent W (5%) in water | 32 ml |
| aqueous 4% solution of formaldehyde | 10 ml |

3. Coating Composition of the Rear Mordanting Layer

| | |
|---|---|
| gelatin | 12 g |
| aqueous dispersion of yellow IRIODINE 9231 (tradename) containing 30% of yellow pigment and 8% of gelatin | 100 g |
| mordant M (20% solution) | 250 ml |
| saponine (12%) and wetting agent W (5%) in water | 32 ml |
| aqueous 4% solution of formaldehyde | 10 ml |

The coating composition was applied at a dry coverage of 0.9 g/$m^2$ of gelatin, and 1.3 g/$m^2$ of interference pigment.

EXAMPLE 4

Example 3 was repeated with the difference that the light interference pigments were applied uniformly in a gelatin top coat covering the mordanting layer. The dried top coat contained 0.5 g/$m^2$ of gelatin and 1.3 g/$m^2$ of interference pigment at each side of the transparent support.

What is claimed is:

1. A security document comprising:

a transparent or translucent support with a visible light-blocking capacity less than 80%, said support having a first side and a second side opposite said first side;

an image or pattern for identification purposes, at said first side or at said second side of said support;

a first layer at said first side of said support;

a first light interference pigment distributed uniformly or patternwise in or on said first layer;

wherein said document, by presence of said first light interference pigment, has at least in certain areas a first color when viewed with light transmitted through the document and a second color, said second color being different from said first color, when viewed with light reflected by the document.

2. Document according to claim 1, wherein said document contains mixtures of different light interference pigments.

3. Document according to claim 1, wherein said first light interference pigment is distributed uniformly in said first layer, wherein said document further comprises a second layer at said second side of said support, and wherein a second light interference pigment, which is different from said first light interference pigment, is distributed uniformly in said second layer.

4. Document according to claim 3, wherein at least one of said first layer and said second layer has underneath and/or on top thereof a second pattern containing common light-reflecting pigments and/or dyes having no light interference properties.

5. Document according to claim 4, wherein said second pattern has a color substantially the same as a color selected from a color seen in transmission mode of said first light interference pigment, a color seen in reflection mode of said first light interference pigment, a color seen in transmission mode of said second light interference pigment and a color seen in reflection mode of said second light interference pigment.

6. Document according to claim 1, wherein said first light interference pigment is distributed patternwise in said first layer and wherein said first layer has underneath and/or on top thereof a third pattern containing common light-reflecting pigments and/or dyes having no light interference properties.

7. Document according to claim 1, wherein said first light interference pigment is distributed patternwise in said first layer and wherein said first layer has underneath and/or on top thereof a third layer having a color substantially the same as a color selected from a color seen in transmission mode of said first light interference pigment and a color seen in reflection mode of said first light interference pigment.

8. Document according to claim 1, wherein said document contains a photographically obtained image or pattern.

9. Document according to claim 8, wherein said photographically obtained image or pattern is produced by means of developed photosensitive silver halide directly in a light-sensitive material or in a non-light-sensitive image receiving material.

10. Document according to claim 8, wherein said photographically obtained image or pattern is produced by means of a non-impact printing technique in which analog or digital input signals for controlling printing stem from photo-signals originating from a visible original.

11. Document according to claim 8, wherein said photographically obtained image or pattern is formed by a silver salt diffusion transfer process in an image-receiving material containing an image receiving layer comprising development nuclei.

12. Document according to claim 8, wherein said photographically obtained image or pattern is formed by a dye diffusion transfer process in an image-receiving material containing a mordant for a dye transferred from an image-wise exposed and developed silver halide emulsion material.

13. Document according to claim 1, wherein said first light interference pigment comprises mica platelets coated with a metal oxide.

14. Document according to claim 13, wherein said metal oxide is selected from the group consisting of $TiO_2$, $ZrO_2$, $Fe_2O_3$ and $Cr_2O_3$.

15. Document according to claim 13, wherein said mica platelets coated with said metal oxide have a second coating of carbon.

16. Document according to claim 13, wherein said mica platelets have a largest surface diameter between 5 and 200 $\mu$m.

17. Document according to claim 13, wherein said first light interference pigment has a thickness between 0.1 and 0.6 $\mu$m.

18. Document according to claim 1, wherein said first light interference pigment is present in said document in a coverage of 0.3 g/$m^2$ to 10 g/$m^2$.

19. Document according to claim 1, wherein said support has been coated directly by sputtering with a thin metal oxide layer or has been coated with said thin metal oxide layer on top of said first layer and wherein said thin metal oxide layer has substantially the same color as a color selected from a color seen in reflection mode of said first light interference pigment and a color complementary to a color seen in reflection mode of said first light interference pigment.

20. Document according to claim 1, wherein underneath and/or on top of said first light interference pigment a guilloche line pattern with rainbow effect has been printed using light reflecting pigments and wherein at least one rainbow color of said guilloche line pattern with rainbow effect is a color selected from a color seen in reflection mode of said first light interference pigment and a color complementary to a color seen in reflection mode of said first light interference pigment.

21. Document according to claim 20, wherein at least one rainbow color of said guilloche line pattern is obtained by printing metallic pigments.

22. Document according to claim 20, wherein fluorescent or phosphorescent pigments have been mixed with a pigment selected from the group of said first light interference pigment and said light reflecting pigments used for printing said guilloche line pattern.

23. Document according to claim 20, wherein at least one rainbow color of said guilloche line pattern is obtained by printing a transparent varnish loaded with a fluorescent or phosphorescent pigment.

24. Document according to claim 20, wherein at least one bi-fluorescent pigment has been mixed with a pigment selected from the group of said first light interference pigment and said light reflecting pigments used for printing said guilloche line pattern, and wherein when exposed to ultraviolet light said at least one bi-fluorescent pigment shows light of two different wavelength ranges, one of said two different wavelength ranges is different from a wavelength range of colors, when observed under visible light conditions, of said light reflecting pigments used for printing said guilloche line pattern and is different from a wavelength range of color, when observed under visible light conditions and in reflection mode, of said first light interference pigment and another of said two different wavelength ranges corresponds with a color selected from a color seen in reflection mode of said first light interference pigment and a color complementary to a color seen in reflection mode of said first light interference pigment.

25. Document according to claim 1, further comprising at least one additional light interference pigment;

wherein a guilloche line pattern with rainbow effect has been printed, using light reflecting pigments, in perfect see-through print register on said first side and said second side of said support;

wherein said light reflecting pigments on said first side of said support each have a color that is selected from colors seen in reflection mode of said first light interference pigment and of said at least one additional light interference pigment;

wherein said light reflecting pigments on said second side of said support each have a color complementary to a color selected from colors seen in reflection mode of said first light interference pigment and of said at least one additional light interference pigment; and wherein said guilloche line pattern has portions at a side selected from said first side and said second side of said support, which portions complete a printed pattern or cover at least partly a photograph or printed pattern that is present at a side of said support opposite said selected side.

26. Document according to claim 1, further comprising at least one additional light interference pigment; and comprising a plurality of patterns partly covering each other, each pattern of said plurality of patterns containing a light interference pigment selected from the group of light interference pigments consisting of said first light interference pigment and said at least one additional light interference pigment; and wherein each selected light interference pigment has a color shift different from color shifts of other selected light interference pigments;

wherein, out of said plurality of patterns, a pattern more remote from an observer has higher covering power than a pattern printed thereon which is more transparent;

thereby obtaining a document that shows, in an area having said plurality of patterns partly covering each other, a continuously changing color shift upon gradual change of observation angle to the document.

27. Document according to claim 1, wherein said document is in a form of a laminate.

28. A security document comprising:

a transparent or translucent support TS with a visible light-blocking capacity less than 80%, said support having a first side and a second side opposite said first side;

an image or pattern for identification purposes, at said first side or at said second side of said support;

a first layer at said first side of said support;

a second layer at said second side of said support;

a light interference pigment A distributed uniformly or patternwise in said first layer;

a light interference pigment B distributed patternwise in said second layer;

a second pattern containing common light-reflecting pigments R on top of said first layer;

a third pattern containing said common light-reflecting pigments R underneath said second layer;

wherein said document, by presence of said light interference pigment A, has at least in certain areas a first color when viewed with light transmitted through the document and a second color, said second color being, different from said first color, when viewed with light reflected by the document.

29. A security document comprising:

a transparent or translucent support TS with a visible light-blocking capacity less than 80%, said support having a first side and a second side opposite said first side;

an image or pattern for identification purposes, at said first side or at said second side of said support;

a first layer at said first side of said support;

a second layer at said second side of said support;

a light interference pigment A distributed patternwise in said first layer;

a light interference pigment B distributed uniformly or patternwise in said second layer;

a second pattern containing common light reflecting pigments R1 underneath said first layer having a color complementary to a color of said light interference pigment A when seen with reflected light;

a third pattern underneath said first layer containing said common light reflecting pigments R1 mixed with colored fluorescent or phosphorescent pigments or dyes RF;

a plurality of fourth patterns underneath said first layer containing solely said pigments or dyes RF;

a fifth pattern underneath said second layer containing metallic pigments M;

a sixth pattern underneath said second layer containing light reflecting pigments R2 having a color complementary to a color of said light interference Pigment B when seen with reflected light;

a seventh pattern underneath said second layer containing metallic pigments M mixed with said common light reflecting pigments R2;

wherein said document, by presence of said light interference pigment A, has at least in certain areas a first color when viewed with light transmitted through the document and a second color, said second color being different from said first color, when viewed with light reflected by the document.

30. A security document comprising:

a transparent or translucent support with a visible light-blocking capacity less than 80%, said support having a first side and a second side opposite said first side;

an image or pattern for identification purposes, at said first side or at said second side of said support;

a light interference pigment distributed uniformly or patternwise in said support;

wherein said document, by presence of said light interference pigment, has at least in certain areas a first color when viewed with light transmitted through the document and a second color, said second color being different from said first color, when viewed with light reflected by the document.

* * * * *